United States Patent
Paushkina et al.

(10) Patent No.: US 8,624,934 B2
(45) Date of Patent: Jan. 7, 2014

(54) DYNAMIC DISPLAY OF ICONS ON A SMALL SCREEN

(75) Inventors: Anastasia Paushkina, Redmond, WA (US); Alfredo Mendonça de Almeida, Redmond, WA (US); Matthew Lenell Cooper, Issaquah, WA (US); Michael J. McCormack, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 60 days.

(21) Appl. No.: 13/248,032

(22) Filed: Sep. 29, 2011

(65) Prior Publication Data

US 2013/0083079 A1    Apr. 4, 2013

(51) Int. Cl.
*G09G 5/00* (2006.01)

(52) U.S. Cl.
USPC .......................... 345/684; 345/472

(58) Field of Classification Search
USPC ................................. 345/472, 684
See application file for complete search history.

(56) References Cited

U.S. PATENT DOCUMENTS

| | | | |
|---|---|---|---|
| 5,870,683 A * | 2/1999 | Wells et al. | ................ 455/566 |
| 2002/0044156 A1 | 4/2002 | Maezawa et al. | |
| 2005/0223338 A1 * | 10/2005 | Partanen | ...................... 715/821 |
| 2007/0143702 A1 | 6/2007 | Maggi | |
| 2009/0083655 A1 | 3/2009 | Beharie et al. | |
| 2009/0089710 A1 | 4/2009 | Wood et al. | |
| 2009/0259559 A1 * | 10/2009 | Carroll et al. | ................... 705/17 |
| 2010/0095248 A1 | 4/2010 | Karstens | |
| 2010/0125807 A1 * | 5/2010 | Easterday et al. | ............ 715/785 |
| 2011/0107222 A1 | 5/2011 | Uchida et al. | |
| 2011/0107269 A1 | 5/2011 | Chiu et al. | |
| 2011/0225506 A1 * | 9/2011 | Casalaina et al. | ............. 715/741 |

FOREIGN PATENT DOCUMENTS

WO    WO 2010034836 A1 *    4/2010

OTHER PUBLICATIONS

Jeong, et al., "Research on Typography to Integrate Transparency and Reflectivity in Interface Design", Retrieved at <<http://www.iasdr2009.org/ap/Papers/Orally%20Presented%20Papers/Interaction/Research%20on%20Typography%20to%20Integrate%20Transparency%20and%20Reflectivity%20in%20Interface%20Design.pdf>>, International Association of Societies of Design Research, Oct. 22, 2009, pp. 621-630.

* cited by examiner

*Primary Examiner* — Maurice L McDowell, Jr.
(74) *Attorney, Agent, or Firm* — Kelly, Holt & Christenson PLLC

(57) ABSTRACT

Where a label for an item to be represented by an icon is customized, the icon is generated to dynamically display all of the label. Thus, at some point, the entire label is displayed, even though only a portion of the label is eventually displayed in the icon.

20 Claims, 18 Drawing Sheets

DYNAMIC DISPLAY OF ICONS ON A SMALL SCREEN

BACKGROUND

Handheld devices and mobile devices are currently in wide use. Such devices can include, for example, cellular telephones, smart phones, personal digital assistants, multimedia players, palmtop computers, slate or tablet computers and even laptop computers. Many of these devices can easily be connected, over a wide area network (such as the Internet) to services that can be delivered from servers or other remote locations, worldwide.

Some of these devices, and particularly the handheld devices, have relatively small display screens. When an application runs in such a space-constrained environment, icons are often used to represent a particular concept and allow for rapid recognition by the user. An icon is a small typographical picture or symbol on a graphical user interface that represents something else, such as a program, command, file, directory (also referred to as a folder) or a device (such as a hard disc drive), etc. The symbol can be a picture or graphic, text or a combination. The symbol is displayed on a computer screen and can be used to navigate a computer system or a mobile device. An icon functions as an electronic hyperlink or file shortcut to access the program or data that it represents.

In many current systems, icons are pre-rendered at design time to correspond, intuitively, to the item that they represent.

However, in some systems, the items that are to be represented by an icon are created dynamically. For instance, in some customer relations management (CRM) systems, customers can create their own objects, and can also generate customized labels for those objects. Thus, the objects, the icons that represent those objects, and the labels, may not be known at design time so the objects (or other dynamically created items) can only be represented by icons at runtime, or during customization by the customer, or at least after design time.

In some current systems, in order to generate an icon that represents an item that was not know at design time, the designer simply pre-defines a plurality of different pictures that can be used at runtime. Then, when the dynamically created item (and its label) is created after design time, the creator selects or specifies which picture is to represent which dynamically created item. Of course, it is impossible to predict all of the different types of items that might be created, and so it can be very difficult to include enough pictures so that one will intuitively represent each of the dynamically created items.

In other current approaches, when a label is generated for the dynamically created item, the icon used to represent that item simply includes the entire text of the label. However, where the labels are long, this can present problems for displaying an icon on a relatively small display screen.

Where the text of the label is used instead of, or in addition to a picture, the text can be miniaturized to fit within a display field of an icon that can be adequately displayed on a relatively small display screen. However, this often results in an icon that has text displayed on it, where the text is undesirably small, making it difficult to read.

Yet another conventional approach is to predefine labels, at design time, for the dynamically created items. Again, however, it is nearly impossible to think of a sufficient number of labels such that one can intuitively represent every dynamically created item.

The discussion above is merely provided for general background information and is not intended to be used as an aid in determining the scope of the claimed subject matter.

SUMMARY

In attempting to generate an icon for a dynamically created item (at the time the dynamically created item is created) one might attempt to simply take the text entered in creating the label for that item, and use only a portion of that text (such as a truncated version of the text or an abbreviation) as the icon. For instance, if the text in the label for an object is "customer" one may attempt to generate an icon by simply deleting some of the letters from that text to arrive at an icon with the letters "cust". While, at first blush, this may appear to be an adequate solution, it can present problems as well. For instance, when the letters in a word or label are truncated in this fashion, they can provide undesirable results. For example, if the text in the label is "association", and the rule for generating the icon is to truncate the text after the first three letters, this can result in an informal, or even vulgar, display. The problem can be even compounded when the application in which the icon is deployed is to be used internationally. Even if the truncated letters do not result in an undesirable display in the source language, they can be interpreted differently in different languages, and they may result in an undesirable display in another language.

Thus, where a label for an item to be represented by an icon is customized, the icon is generated to dynamically display a substantial entirety of the label. Thus, at some point, the entire label is displayed, even though only a portion of the label is eventually displayed in the icon.

For instance, the label is scrolled across a display field of the icon. Where the label includes text, the label can be scrolled beginning at the end of the word and ending at the beginning of the word. In this way, the user can see the entire label represented by the icon, before the final display (e.g., of the first few letters) is rendered. In another embodiment, the entire label is first displayed within the icon in relatively small letters, and the display is then changed to dynamically give the perspective of zooming in on just a smaller portion of the label.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
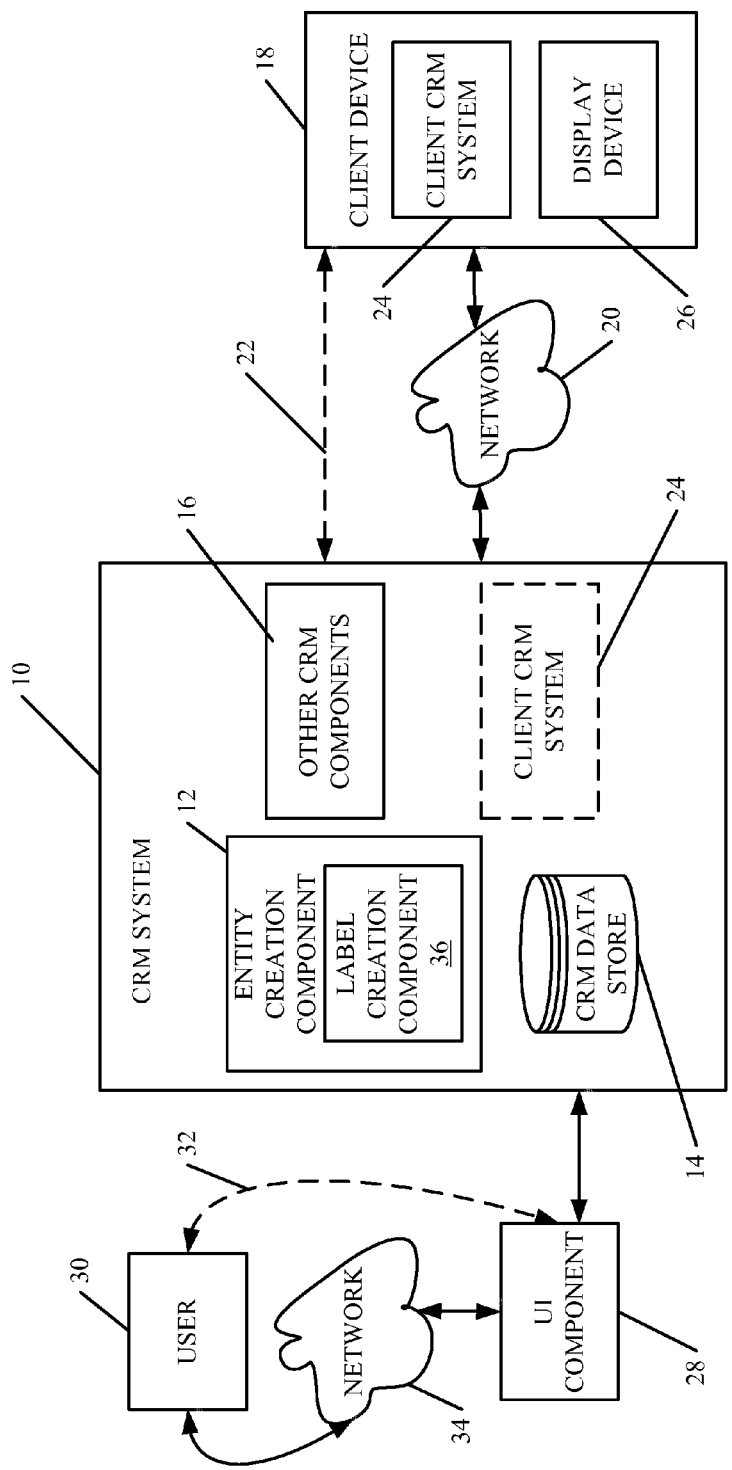
FIG. 1 is a block diagram of one illustrative customer relations management (CRM) system.

FIG. 1 is a block diagram of one embodiment of a customer relations management (CRM) system 10. The dynamic display of an icon described herein can be used in a wide variety of different systems. For instance, it can be deployed in any system where a user customizes labels for classifications of things that are represented by icons. Some examples of these things can be database tables, user names, or any of the other items that can be represented by icons. However, for the sake of example, the dynamic display of icons described herein will be described in the context of CRM system 10, without limitation.

FIG. 1 shows that CRM system 10 includes entity creation component 12, CRM data store 14, and other CRM components 16. FIG. 1 also shows that CRM system 10 is connected to a client device 18, such as through network 20 or directly (as illustrated by arrow 22). Client device 18 is illustratively a mobile device that has components for running the client related features of CRM system 10 on client device 18. These components are collectively labeled as client CRM system 24. Client device 18 also illustratively includes display device 26, such as a display screen for displaying graphical user interface items thereon. It will be noted that a variety of different embodiments of client device 18 are described below with respect to FIGS. 13-15, and some examples can include cellular telephones, smart phones, personal digital assistants, slate computers, or tablet computers, multimedia players, other handheld or palmtop devices, etc.

FIG. 1 also illustrates an alternative embodiment in which client CRM system 24 is hosted (or provided as a service over network 20) by CRM system 10. This is indicated by client CRM system 24 being shown in phantom in FIG. 1.

CRM system 10 is shown connected to a user interface component 28 that provides user interface displays to user 30 either directly (as indicated by arrow 32) or over a network 34.

CRM system 10 illustratively operates to manage a company's interactions with customers clients, and sales prospects. This management involves using CRM system 10 to organize, automate and synchronize business processes. In one embodiment, these processes can involve sales activities and also marketing, customer service and technical support. Thus, CRM system 10 illustratively provides technology and support for creating customer accounts, creating sales accounts, monitoring contacts and leads and a wide variety of other business-related activities that are related to such things as sales, marketing, customer service, and technical support.

In providing these features, CRM system 10 includes entity creating component 12 that, itself, includes label creation component 36. Entity creation component 12 allows a user 30 to create his or her own objects or entities for use by other CRM components 16. For instance, entity creation component 12 allows user 30 to create a new customer object that can be used to represent a customer. It also allows the user to create new contact objects that represent potential customers, and lead objects that may also represent potential customers. Similarly, entity creation component 12 allows user 30 to create sales objects that represent sales or pending transactions, or account objects that represent the account of an individual client or company. Of course, entity creation component 12 can be used by user 30 to create substantially any other object that can be used in the operation of CRM system 10.

Label creation component 36 allows user 30 to generate a label for a newly created object (or entity). In one embodiment, label creation component 36 provides a user interface display through UI component 28, to user 30 that includes an input box that allows the user to input or specify a symbol to be used as a label. The symbol can be a picture, another type of graphic or iconographic symbol or text or a combination of these. Where the label is to include text, the input mechanism can be a text box which allows the user to generate the label for a particular entity or object by typing the label into the text box. The user interface display also illustratively allows user 30 to identify the entity type, enter data associated with that entity, and provide a variety of other attributes for the entity or object that was created. Entity creation component 12 then illustratively creates an entity record (such as entity record 40 shown in FIG. 2) that represents the entity or object that was just created by user 30.

Figure 2:
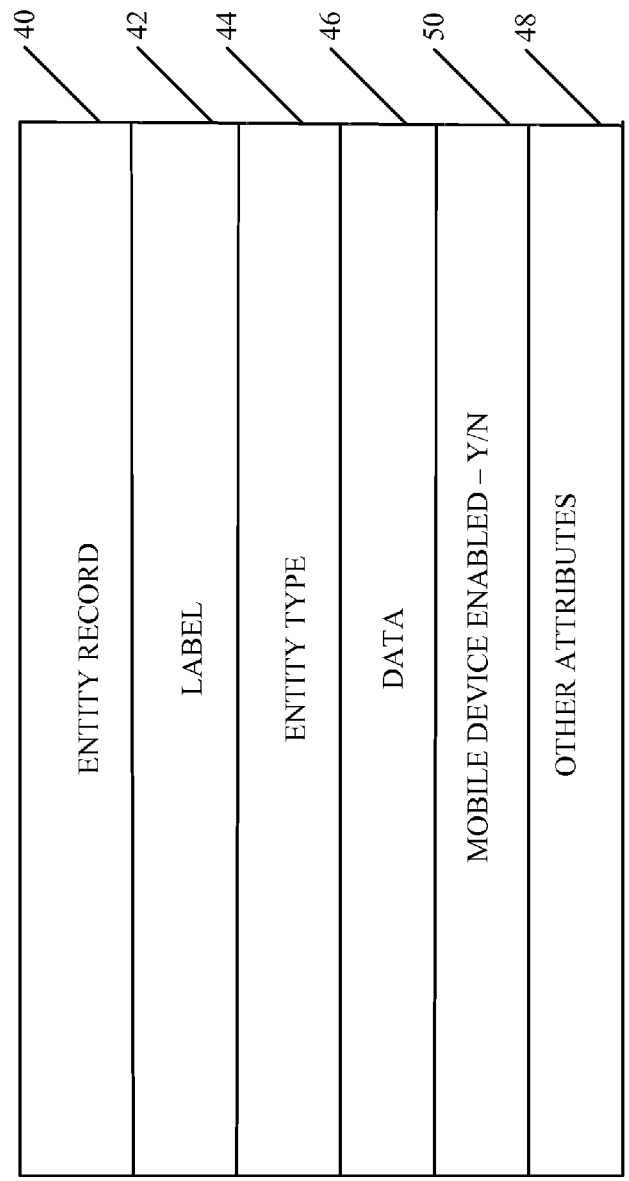
FIG. 2 is one illustrative embodiment of an object or entity record that is created using the system shown in FIG. 1.

It can be seen in FIG. 2 that one illustrative entity record includes attributes that include label 42 (which corresponds to the text or other symbol entered by using label creation component 36) entity type attribute 44 that identifies the type of the entity just created, data 46 that includes data (either entered at creation time, or later, or both) represented by the entity just created, and other attributes 48, as desired by user 30. In addition, in one embodiment, entity creation component 12 allows the user to set an attribute 50 that indicates whether this particular entity will be enabled for display on mobile devices. That is, the user can select whether this particular entity will be represented by an icon on mobile device displays, and be accessible through a mobile device 18 connected to CRM system 10. Of course, attributes 40-50 are illustrative only, and other or different attributes can be used as well. In any case, once the entity record 40 is created, entity creation component 12 illustratively stores it in CRM data store 14 for later use by CRM system 10.

It may happen that the display device 26 on client device 18 (on which an icon representing entity record 40 is to be displayed) may be relatively small. In that case, it may be difficult, as described in the background, to sufficiently display an icon that the user can intuitively associate with this particular entity record 40. Therefore, FIG. 3 is a flow diagram illustrating one embodiment of the operation of client CRM system 24 (either on client device 18 or in CRM system 10) in rendering the display of an icon representing entity record 40 on display device 26.

Figure 3:
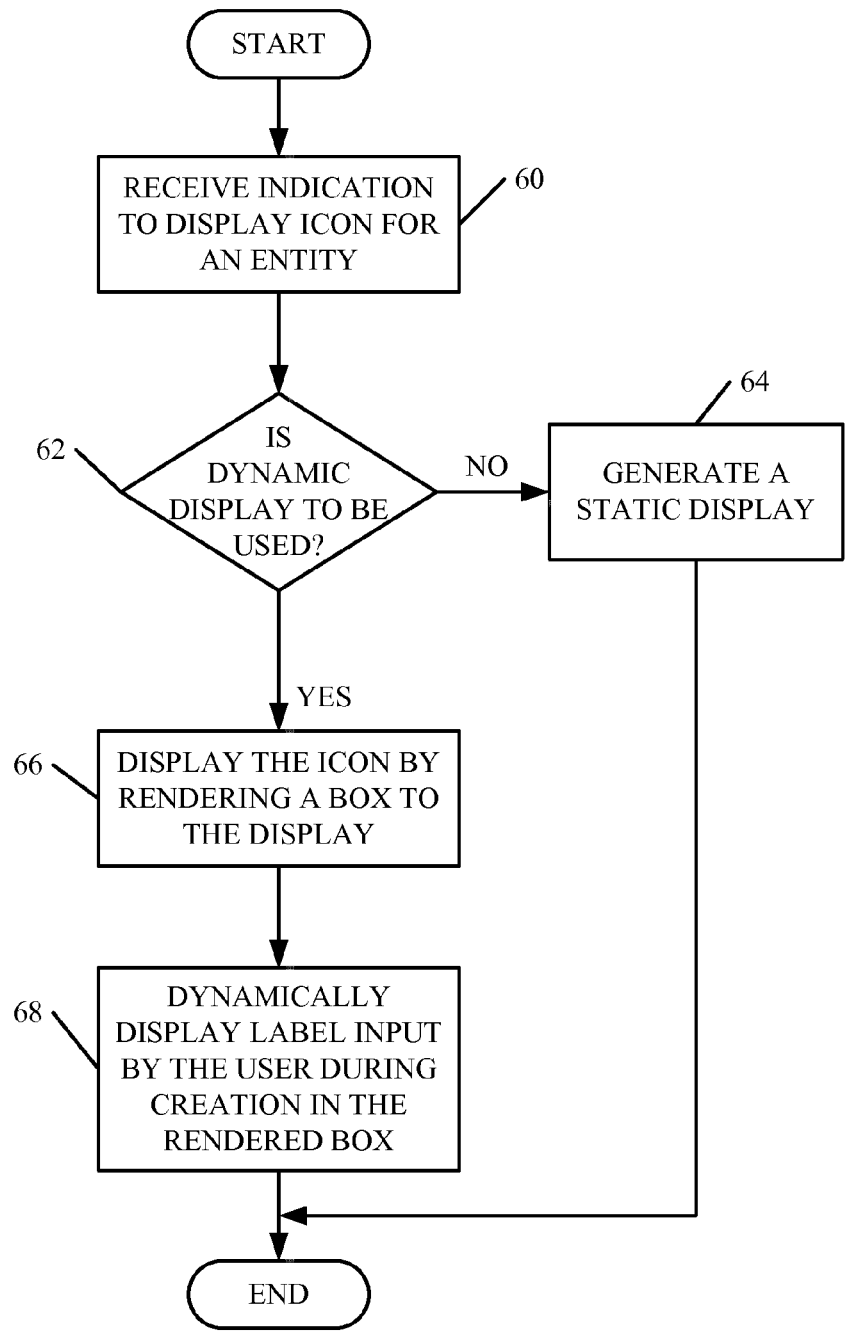
FIG. 3 is a flow diagram of one embodiment of the operation of the system shown in FIG. 1 in displaying an icon.

FIG. 3 shows that client CRM system 24 first receives an indication to display the icon for entity record 40. This is indicated by block 60 in FIG. 3. For instance, it may be that the user launches a CRM application, or a particular CRM function, where displaying the icon representing entity record 40 is appropriate. That is, assume that the user has opened the sales records for a particular client, using client CRM system 24. In that case, assume that the user of client device 18 has also requested to see the customer accounts for customers within a certain geographic region. Then, icons for an entity record 40 corresponding to each of those customers will be displayed on display device 26, for selection by the user. Thus, client CRM system 24 will have received an indication from the user (or from the application) to display an icon for the given entity record 40 being discussed.

Client CRM system 24 then determines whether the particular entity is one in which the dynamic display capability can be used. For instance, client CRM system 24 may illustratively examine attribute 50 in entity record 40 to determine whether it has been enabled for display on a mobile device. Of course, system 24 can look at a wide variety of any other types of metadata corresponding to a given entity record to make this determination. For instance, it may be that the dynamic display is only used where the label has reached a sufficient length. By way of example, if the label is a text label and the text label is only three letters, then it may be displayable, even on a relatively small screen, with sufficient size so that dynamic display is not needed. Of course, system 24 can determine whether dynamic display is to be used in a variety of other ways as well. Determining whether the dynamic display is to be used is indicated by block 62 in FIG. 3.

If, at block 62, it is determined that the dynamic display is not to be used, then client CRM system 24 generates a static display of the icon, simply showing the label for that icon in a display box, or other display field, on the icon. This is indicated by block 64 in FIG. 3.

If, however, at block 62, it is determined that dynamic display is to be used for the icon representing a given entity record that is to be displayed on display device 26, then client CRM system 24 first displays the icon by rendering a box or other display portion (or display field) to the display device 26. This is indicated by block 66 in FIG. 3. Then, client CRM system 24 dynamically displays the label for the given icon that was input by the user when the entity record represented by this icon was created. The label input by the user is dynamically displayed within the rendered box on display device 26. This is indicated by block 68 in FIG. 3 and can take a variety of different forms.

A number of exemplary different forms of generating a dynamic display are discussed below with respect to FIGS. 4-12C. Briefly, however, the dynamic display can be progressive in which the label is scrolled across the rendered box so that the user eventually sees the entirety of the label but only a portion is displayed at any given time, or it can be displayed using a zoom feature in which the user first sees the entirety of the label but then the label is enlarged (given the appearance of zooming in on it) so that only a portion of the label is seen and not the entirety of the label. For instance, where the label is a text label, only the first several letters of the text label are visible within the display field, or the dynamic display can be generated in other ways as well.

Figure 4:
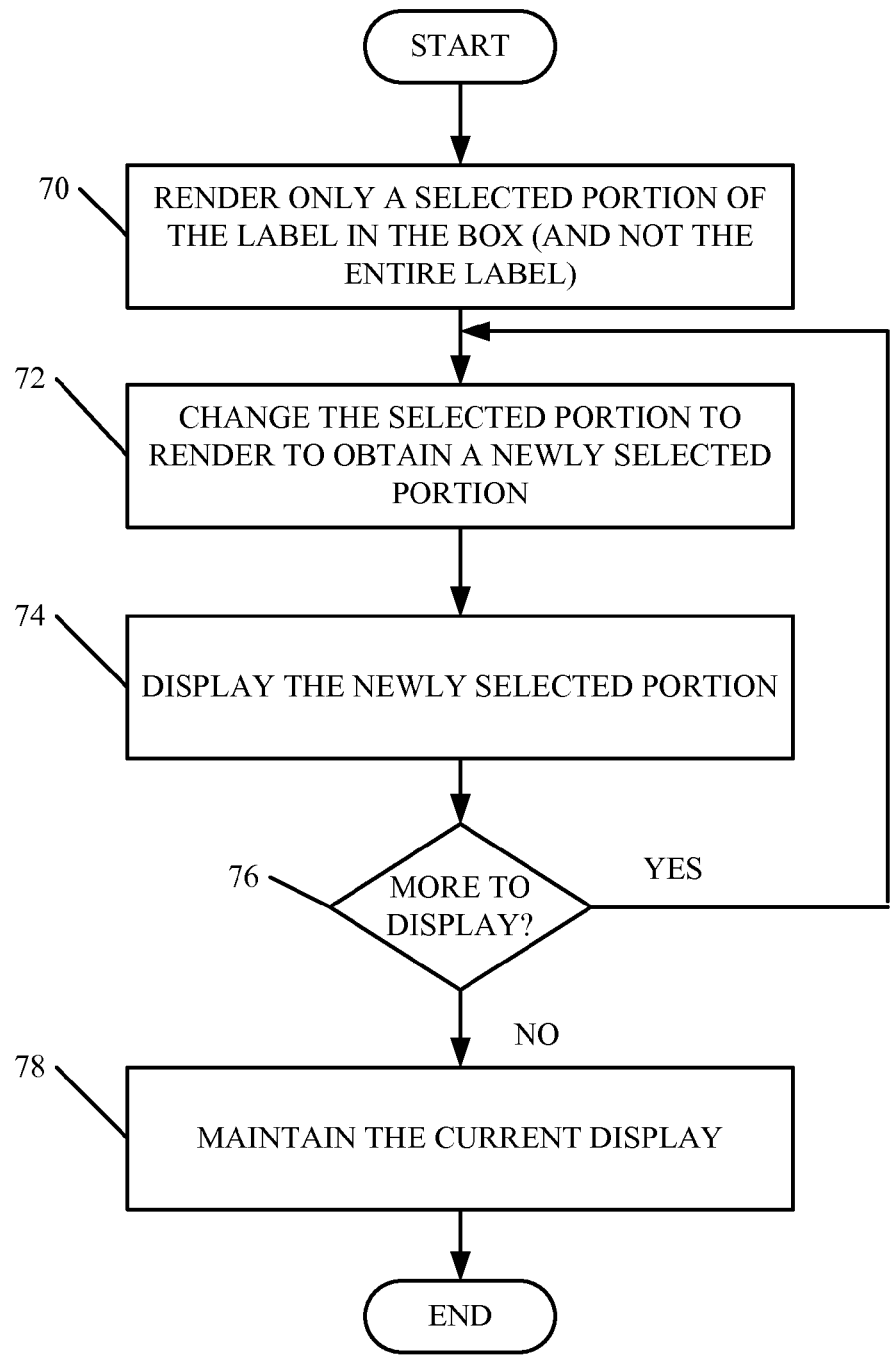
FIG. 4 is a flow diagram illustrating a more detailed embodiment for progressively displaying an icon.

FIG. 4 shows one embodiment for progressively displaying the label to generate the dynamic display within an icon. In the flow diagram of FIG. 4, the client CRM system 24 first identifies the particular icon to be displayed and accesses the label 42 for the entity record represented by that icon and then renders only a selected portion of the label in the rendered box, and not the entire label. That is, in an example where the text label is "accounts", system 24 only renders several letters of the label "accounts" and not the whole word. This is indicated by block 70 in FIG. 4.

Then, system 24 changes the selected portion of the label rendered to obtain a newly selected portion. This is indicated by block 72. By way of example, assume that system 24 first generates the box (or display field) for the icon for the "accounts" entity record but displays only the last three letters "unt" in the rendered box for the icon. Then, at block 72, system 24 changes the label so that it is displaying the last four letters "count" in the box. This gives the appearance of scrolling the display from the back of the label (in this case a word) to the front of the label. Displaying the newly selected portion is indicated by block 74.

In one embodiment, client CRM system 24 then determines whether the entire label has been displayed or whether there is more to display. This is indicated by block 76 in FIG. 4. Continuing with the same example, assume that system 24 determines that there is more text to display in the "account" label. In that case, processing returns to block 74 where system 24 again changes the portion of the text label that is to be displayed in the box. In this instance, assume that system 24 has changed it to the first several letters "accou" and that newly identified portion is then displayed in the rendered box as indicated by block 74. By progressively displaying only a portion of the label and then continuously changing the portion displayed and redisplaying that new portion, this gives the appearance of scrolling the label across the rendered box until the whole label has been displayed.

Once client CRM system 24 determines that there is no more of the label to be displayed, it simply, in one embodiment, maintains display of the current portion of the label as a static display. For instance, where system 24 has scrolled the "accounts" text label across the rendered box from the end of the word until the beginning of the word so that only the letters "accou" are currently being displayed, then it simply pauses and maintains that display until further action is received from the user. This is indicated by block 78 in FIG. 4. Of course, additional scrolling can be performed as well.

Figure 5:
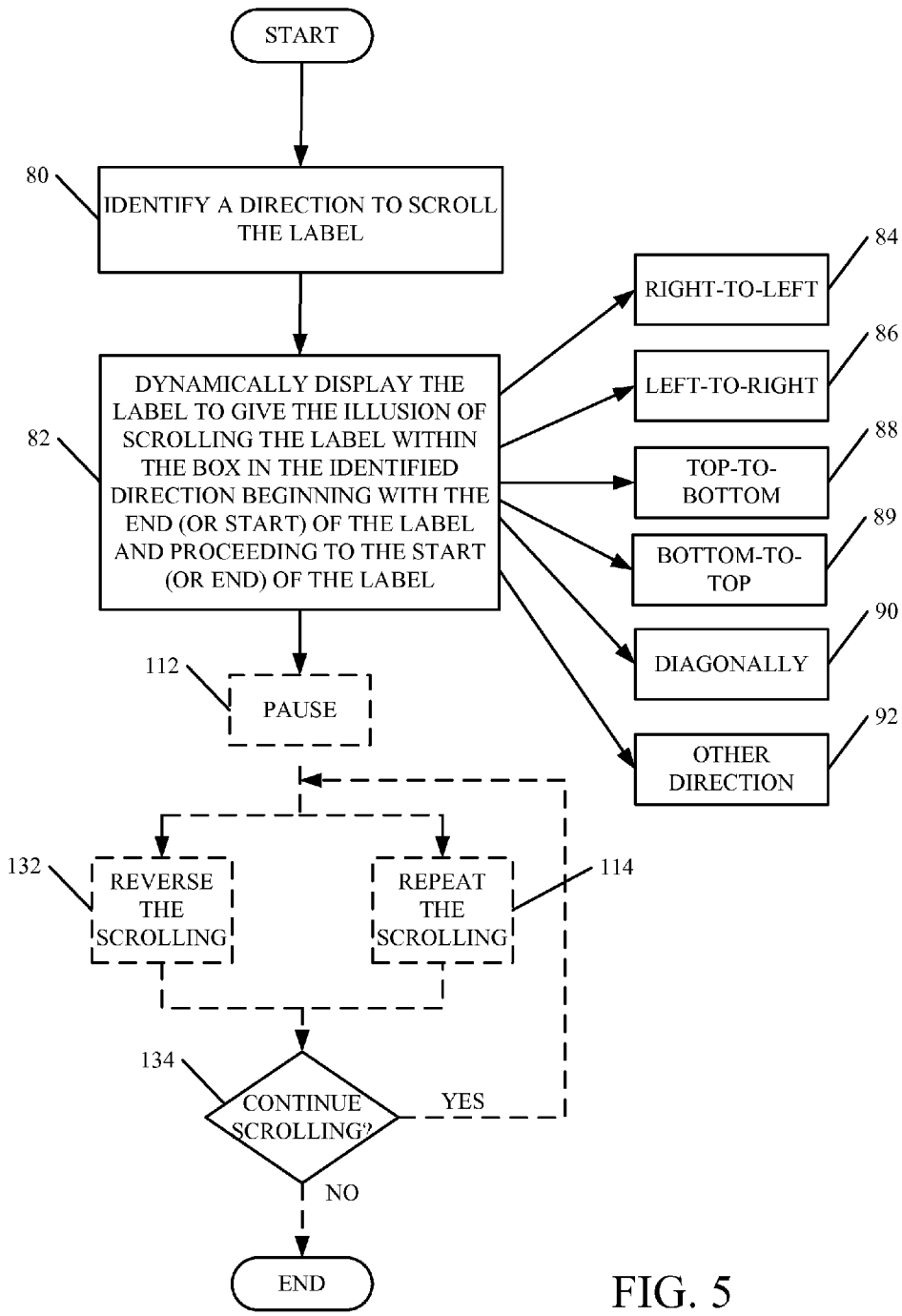
FIG. 5 is a more detailed block diagram showing one embodiment for scrolling the label of an icon.
Figure 6:
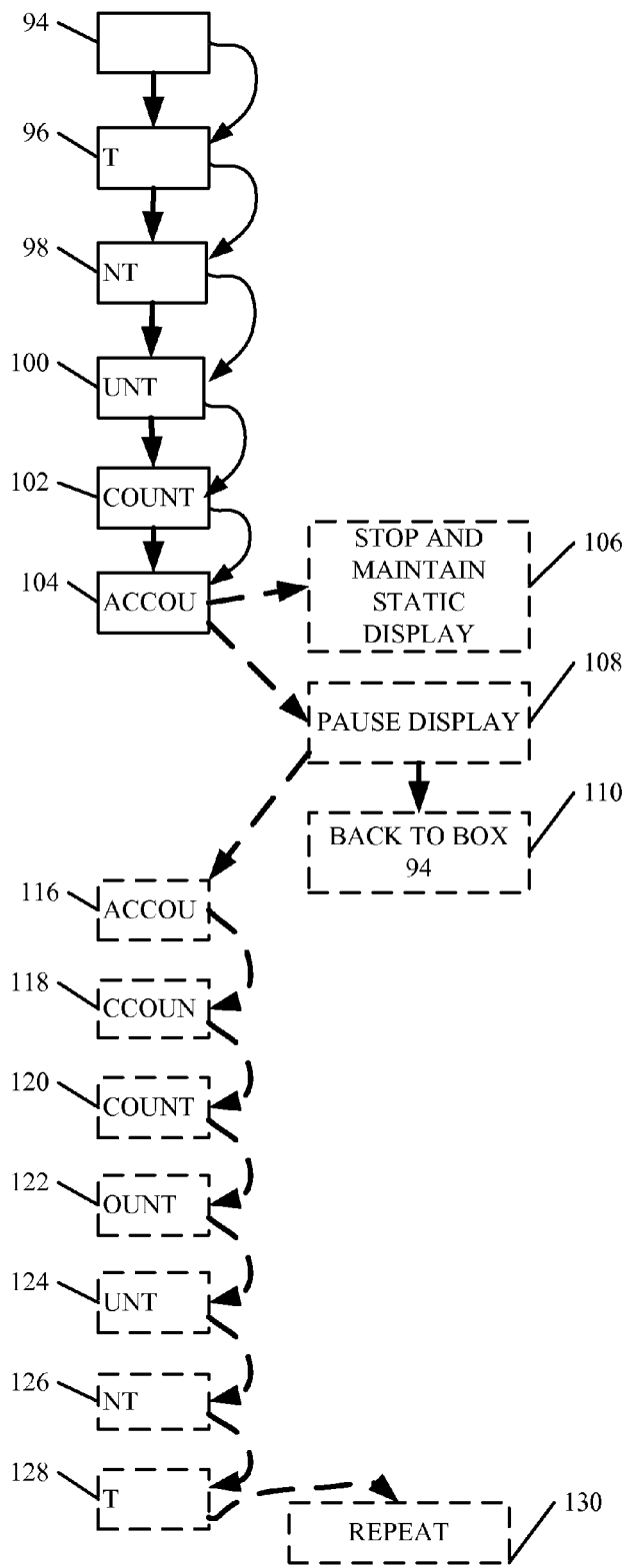
FIG. 6 shows one embodiment of progressive screen shots for progressively displaying an icon.

FIG. 5 is a more detailed flow diagram illustrating the progressive display described above with respect to FIG. 4. FIG. 6 shows a plurality of screen shots of a displayed icon using the progressive display described in FIG. 5. FIGS. 5 and 6 will now be described in conjunction with one another. They will be described using an icon display for an exemplary entity record that has a text label "account", although it will be appreciated that the same technique can be used for substantially any label.

As shown in FIG. 5, client CRM system 24 first identifies a direction to scroll the text of the label. In the embodiment being discussed, the icons are typographic icons, meaning that they are icons with type arranged on them. Therefore, it may be desirable to scroll the text in a particular direction. For instance, if the language being used is a language that is read from left to right, then it may be desired to scroll the text from the end of the text to the beginning of the text. In this way, the user can progressively view the entire text label, but the final display of the text label may be the first few letters of the text label. Alternatively, if the language is a language that is read from right to left, then the label may be progressively scrolled across the icon box from left to right to give the same affect. Similarly, where the language is read from top to bottom or bottom to top, the direction of the scroll may change accordingly. In addition, other directions can be used as well. For instance, regardless of the direction that the text is read, it may be always scrolled from left to right or right to left. Of course, it may be scrolled diagonally, up or down, or the direction can change within the display field of the icon. For instance, the text may first be scrolled in a direction that is diagonally upward and then, halfway through the display field, it can be scrolled in a direction that is diagonally downward. Of course, other scrolling directions can be used as well. Identifying a direction to scroll the text in the label is indicated by block 80 in FIG. 5.

Next, system 24 dynamically displays the text to give the illusion of scrolling the text within the display field in the identified direction (identified at block 80 above). In the embodiment being discussed, the scrolling begins with the end of the text label and proceeds to the start of the text label, although it could begin at the start and proceed to the end as well. In any case, scrolling the text in the identified direction is indicated by block 82. FIG. 5 also shows a number of specific embodiments for the scrolling direction including right-to-left as indicated by block 84, left-to-right is indicated by block 86, top-to-bottom as indicated by block 88, bottom-to-top as indicated by block 89, diagonally in any direction as indicated by block 90, and other directions as indicated by block 92.

One example of scrolling the text is shown in FIG. 6. FIG. 6 shows a plurality of successive screen displays for the icon that represents the "account" entity record. FIG. 6 shows that the first screenshot simply includes the rendered box (or display field) 94 for the icon, with no text in it. FIG. 6 then shows that, in this embodiment, the scroll is to proceed from left to right, starting with the end of the word and proceeding to the beginning of the word. Therefore, in the next screenshot, box 94 includes the letter "t" because it is the final letter in the text label "account". This is indicated by block 96. The text is continually scrolled through the icon box from the end of the word to the beginning of the word until only the first five letters of the word "account" are shown. This is indicated by blocks 98, 100, 102 and 104.

At that point, client CRM system 24 can continue to display the icon in one of a variety of different ways. For instance, client CRM system 24 can simply stop scrolling and maintain a static display such as that shown in box 104. This is indicated by block 106. Alternatively, system 24 can simply pause the scrolling so that the icon shown at block 104 is maintained on display device 26 momentarily, and then the display can proceed back to box 94 and the scrolling can repeat through boxes 96-104. This is indicated by blocks 108 and 110 in FIG. 6, and this gives the visual impression that the "account" text label is continuously scrolled from the end of the word to the beginning, and that scroll is repeated every so often. This is also indicated by blocks 112 and 114 in the flow diagram of FIG. 5.

Alternatively, after the scroll is momentarily paused at block 104, the scroll can be reversed. That is, the text label can then be scrolled in a direction from right to left as indicated by blocks 116, 118, 120, 122, 124, 126 and 128. This gives the impression of the icon scrolling the "accounts" label from the end of the word to the beginning of the word, pausing momentarily and then reverse scrolling the text label from the beginning of the word to the end of the word. This scrolling can then be repeated as indicated at block 130 in FIG. 6. Reversing the scroll direction is also indicated by block 132 in the flow diagram of FIG. 5.

Once the processing reaches either blocks 114 or 132 in FIG. 5, then system 24 determines whether it is to continue the scrolling process. For instance, it may continuously repeat scrolling until some further user interaction is received, or it may simply maintain a static display after the text scrolling has been completed. If scrolling is to be repeated, then processing returns to the output of block 112 in FIG. 5. If not, then a static display is maintained. This is indicated by block 134 in the flow diagram of FIG. 5.

Figure 6A:
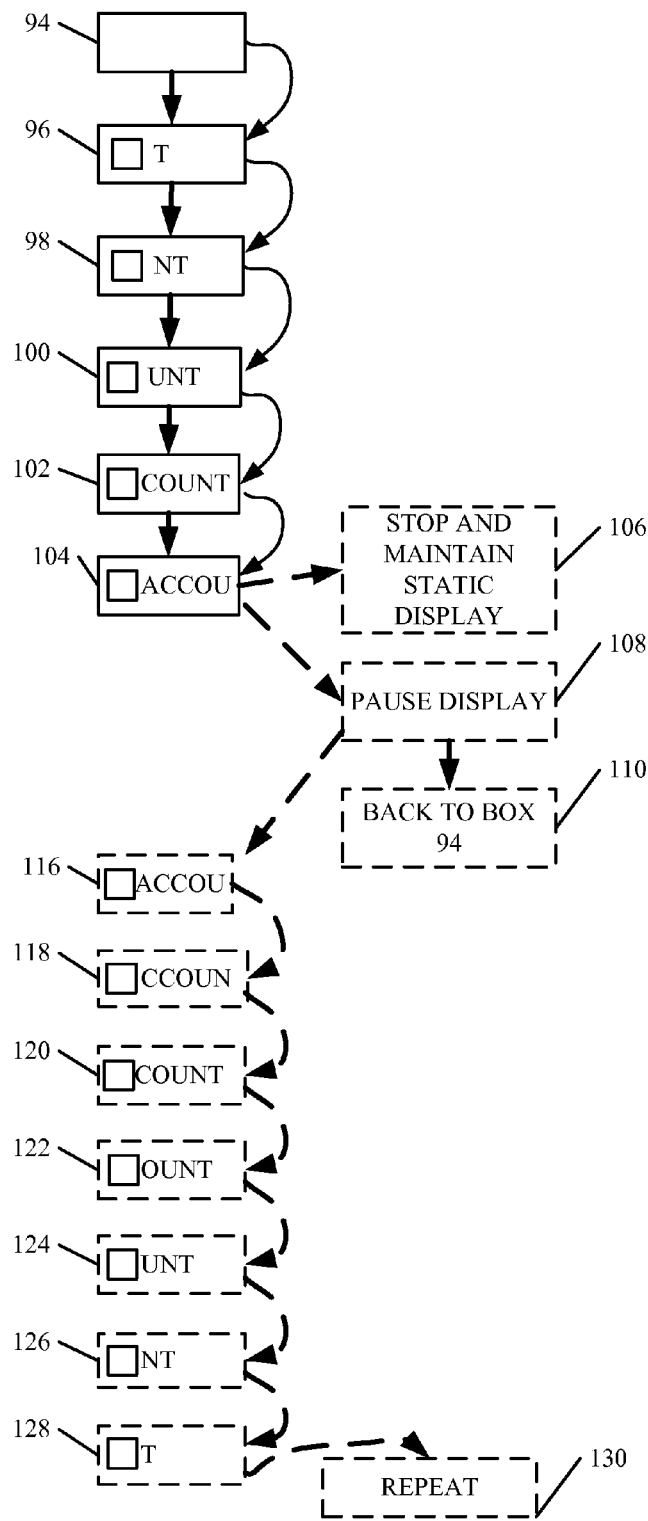
FIG. 6A shows another embodiment of progressive screen shots for progressively displaying an icon that includes a picture or graphic in the label.

FIG. 6A is similar to FIG. 6 and similar items are similarly numbered. However, FIG. 6A shows that the symbol used as the label includes both text, and a picture or other graphic or non-text symbol represented by the box preceding the text. Of course, the label could be only a picture or other non-text symbol as well.

Figure 7:
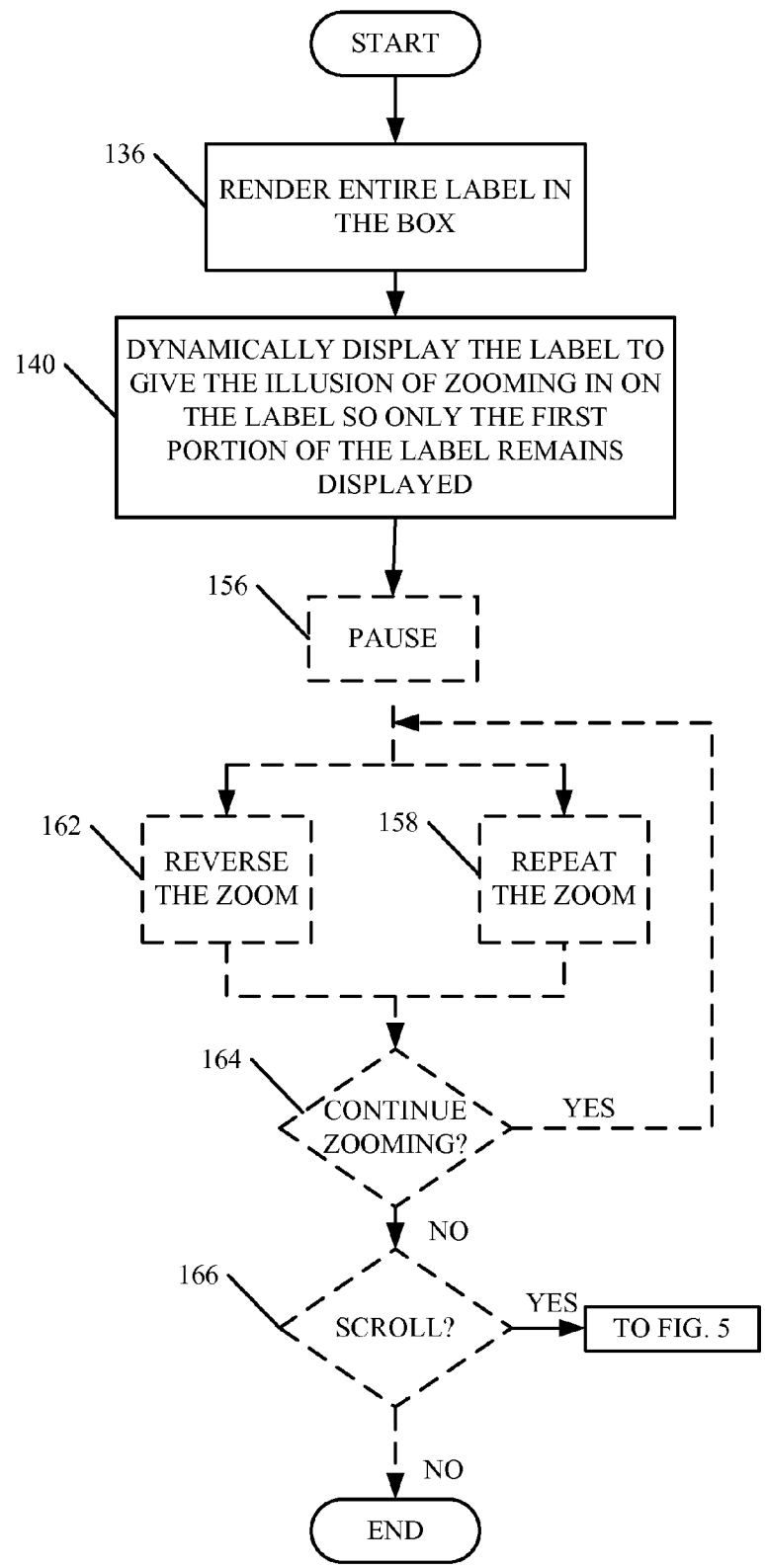
FIG. 7 is a flow diagram showing another embodiment for dynamically displaying an icon.
Figure 8:
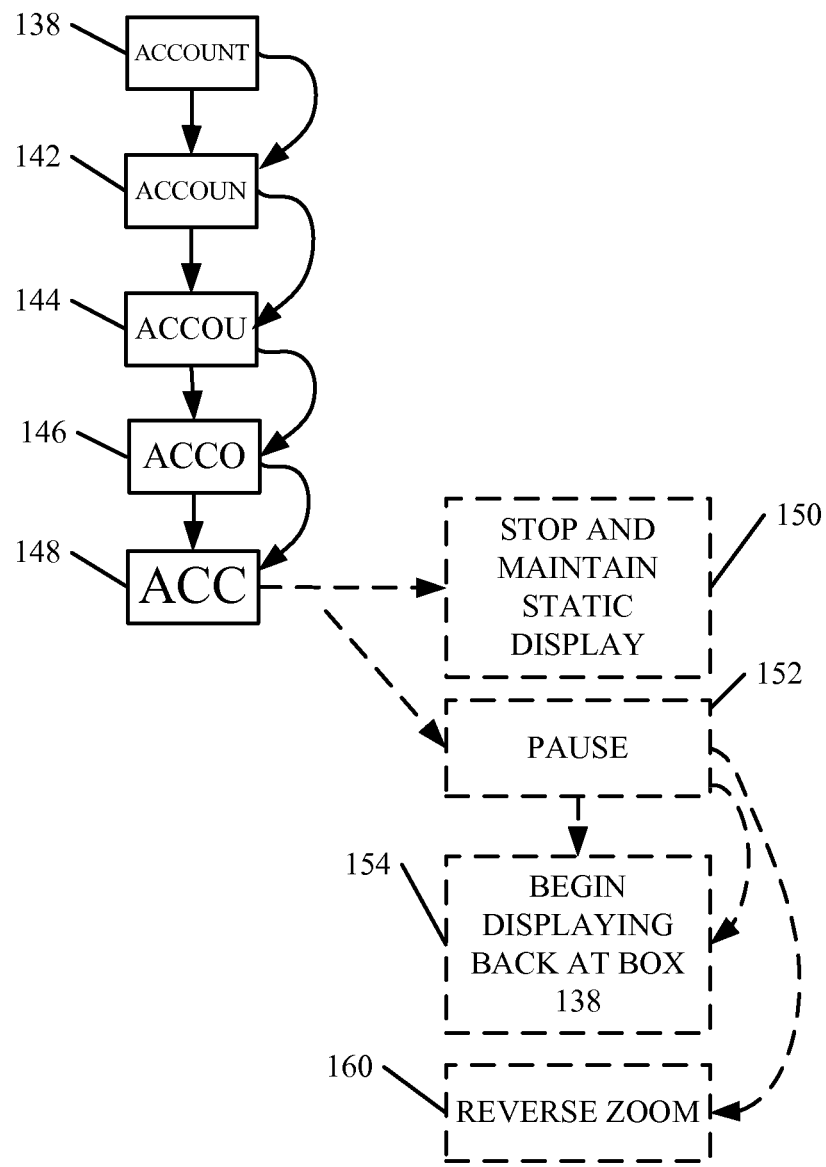
FIG. 8 shows one embodiment of progressive screen shots using the operation shown in FIG. 7.

FIG. 7 is a flow diagram illustrating a different type of dynamic display, other than the progressive display described above with respect to FIGS. 5 and 6. In the embodiment shown in FIG. 7, instead of a scrolling feature, a zooming feature is used. FIG. 8 shows successive screen shots that show the display field for the textual icon representing the "account" entity record. FIGS. 7 and 8 will now be described in conjunction with one another. Of course, while they are described with respect to displaying the text label "account" the processing may be the same for any other label and the "account" text label is used by way of example only. In the embodiment shown in FIGS. 7 and 8, system 24 first displays the entire text label within the rendered box (or display field) for the icon. This is indicated by block 136 in FIG. 7 and is shown at screenshot 138 in FIG. 8. It can be seen in FIG. 8 that the entire text label "account" is displayed within the rendered box. However, it may be that this requires the size of the font used to display "account" to be undesirably small, especially on a small screen device.

Therefore, system 24 controls the display in the icon box to give the illusion of zooming in on the text "account" so that, eventually, only the first portion of the text remains displayed in the icon box. This is indicated by block 140 in FIG. 7 and is shown by the progressive displays 142, 144, 146 and 148 in FIG. 8. These displays show that the font size of the text displayed in the icon box continues to grow until only the first three letters of the text label "acc" fill the entire icon box. It can thus be seen that by using this dynamic display, the user is first shown the entire text label, but then the text label is continuously increased in size (giving the illusion that the icon box is zooming in on the text label) until only the first several letters of the text label are visible within the icon box.

At that point, system 24 can control the display in a number of different ways. For instance, it can simply stop as indicated by block 150 in FIG. 8 and maintain a static display such as that shown by box 148 in FIG. 8. Alternatively, system 24 can pause the display momentarily as indicated by block 152 and then repeat the display generated at boxes 138-140. This is indicated by block 154 in FIG. 8. That is, system 24 can continue to display the icon by reverting back to displaying the entire text label (at block 138) and then zooming in on the text label again as indicated by boxes 142-148 in FIG. 8. Pausing and then repeating the zoom process is indicated by blocks 156 and 158 in the flow diagram of FIG. 7.

Alternatively, after the display shown in icon box 148 is generated, system 24 can reverse the zoom process so that the displays are generated in reverse order from boxes 148 to 138. This is indicated by block 160 in FIG. 8. Reversing the zoom is also indicated by block 162 in the flow diagram of FIG. 7.

System 24 then determines whether the zooming display is to be continued. If so, and processing reverts to either block 158 or 162 in FIG. 7 and the zoom process is either repeated or reversed and zooming continues. This is indicted by block 164 in the flow diagram of FIG. 7.

Figure 8A:
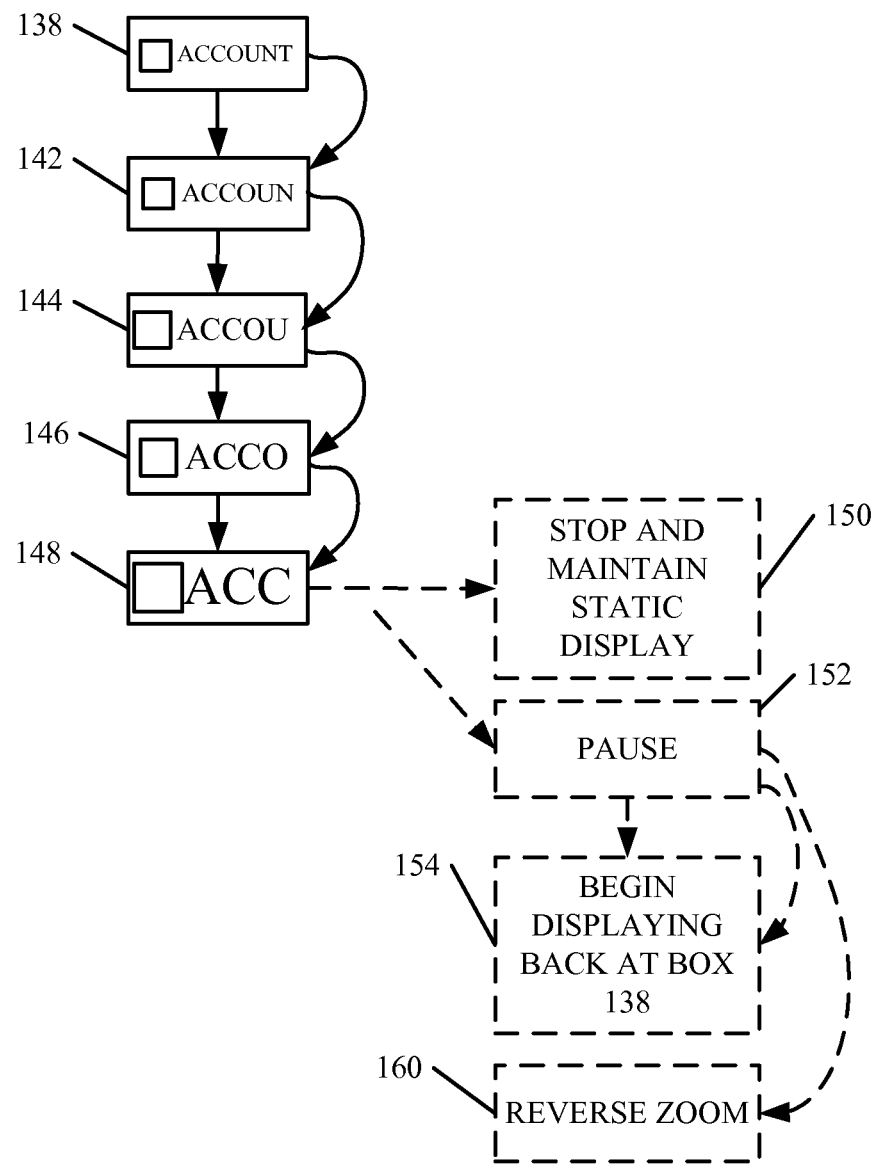
FIG. 8A shows another embodiment of progressive screenshots for an icon that includes a picture or graphic in the label.

FIG. 8A is similar to FIG. 8 and similar items are similarly numbered. However, FIG. 8A shows that the symbol used as the label includes both text and a picture or other graphic or non-text symbol represented by the box preceding the text. Of course, the label could be only a picture or other graphic or non-text symbol as well.

In one illustrative embodiment, system 24 can combine zooming and scrolling. For instance, after the zooming dynamic display (as shown in FIGS. 7 and 8) is generated, and, the icon box display is that shown by box 148 in FIG. 8, then system 24 can scroll the text label as discussed above with respect to FIGS. 5 and 6. This is indicated by block 166 in the flow diagram of FIG. 7. Of course, it will be noted that system 24 can first scroll and then zoom the text display so that it can alternate scrolling and zooming or any other combinations of dynamic display as well. Zooming and then scrolling is illustrated in FIG. 7 as but one example of this.

Figure 9:
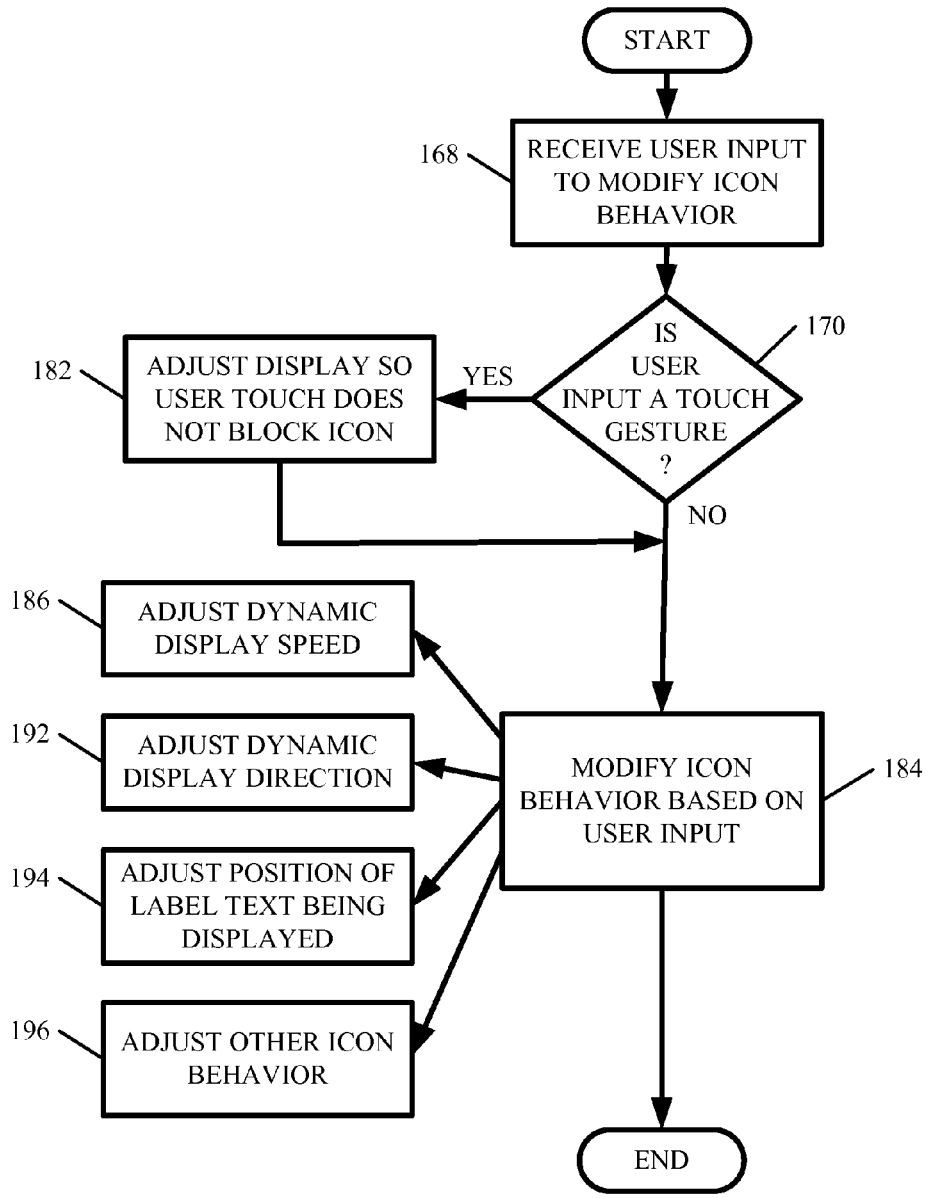
FIG. 9 is a flow diagram showing one embodiment of how a user can modify the dynamic display of an icon.

FIG. 9 is a flow diagram illustrating one embodiment of the operation of system 24 where a user provides an input to modify the icon behavior. That is, in various embodiments, client device 18 can include user input mechanisms (such as a touch sensitive screen, keypads, user input buttons, or actuators, or other user interface elements) that allow a user to interact with the icon. In various embodiments, functionality is provided by system 24 to allow the user to provide a user input to modify the dynamic display behavior of a given icon. A variety of different ways for doing this are described with respect to the flow diagram of FIG. 9 and are shown in the pictorial user interface displays of FIGS. 10A-12C.

While the behavior modification described with respect to FIG. 9 is described in terms of the user providing a touch sensitive gesture, the same functions can be performed with respect to the user providing other user inputs such as through a hardware keypad or other user input mechanisms. Modifying the icon behavior is described with respect to the user input being a touch sensitive gesture for the sake of example only.

FIG. 9 first shows that, once the icon is displayed with the dynamic textual display, device 18 receives a user input to modify the icon behavior. This is indicated by block 168 in FIG. 9. It can take a wide variety of different forms. For instance, where the display device 26 of client device 18 is a touch sensitive display, then the user input may be a touch gesture on the display device. Alternatively, the user input may take the form of the actuation of a soft button, or a hardware button, or other hardware input, such as a scroll button, or such as by manipulating a pointer on display device 26 and selecting a feature from a dropdown menu, activating a radio button, or a wide variety of other user inputs.

Figure 10A:
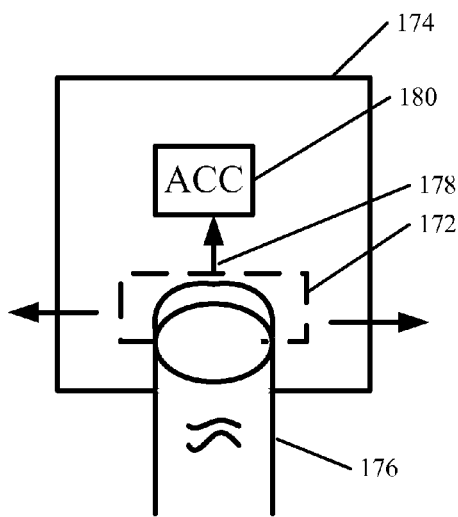
FIGS. 10A-10C pictorially illustrate user modification of the display of an icon.

Once the user input is received, system 24 determines whether the user input is a touch gesture on a touch sensitive screen. This is indicated by block 70. For instance, where display device 26 is a relatively small screen, and the user touches an icon, the user touch may block the user's ability to view the label of the icon. That is, the user's finger may be covering almost the entire icon. Therefore, in one embodiment, if the user input is a touch sensitive gesture relative to the icon (as determined at block 170), then client CRM system 24 adjusts the display so that the user's touch does not block the icon. FIG. 10A shows one embodiment of this. For instance, the dashed box 172 in FIG. 10A illustrates the position on a user interface display screen 174 of an icon displaying the "accounts" text label. When the user's finger 176 touches that icon, then system 24 adjusts the position of the icon upward, in the direction generally indicated by arrow 178, so that the icon appears just above the user's finger 176, as indicated by icon 180, so the user's finger does not block the icon. In one embodiment, the icon 180 is still maintained in close proximity to the touch gesture so that the user intuitively knows that he or she is still controlling that particular icon 180. Adjusting the display so the user touch does not block the icon is indicated by block 182 in FIG. 9.

System 24 then modifies the icon behavior based on the user input. This is indicated by block 184 in FIG. 9.

For instance, it may be that by moving the user's finger in the up or down direction, the user can control the speed at which the dynamic display proceeds. That is, if the icon is using the dynamic display according to a display pattern that exhibits a scrolling behavior, the user moving his or her finger in a predetermined direction may control the speed of the scroll. If the icon is using the dynamic display according to a display pattern that exhibits a zooming behavior, the user moving his or her finger in that direction may control the speed of the zoom. Adjusting the dynamic display speed based on the user input is indicated by block 186 in FIG. 9.

Figure 10B:
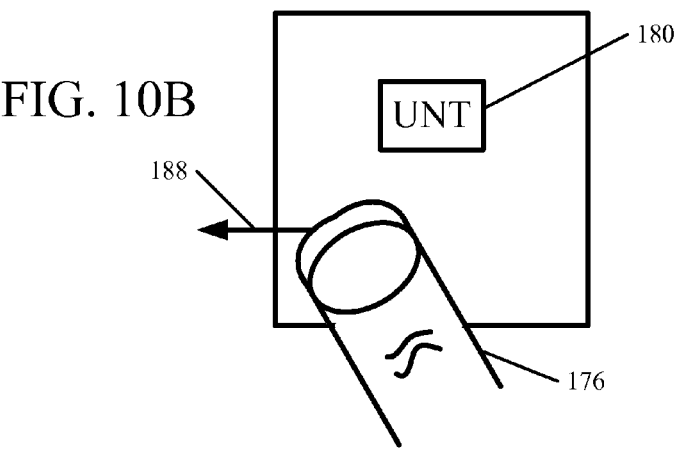
Figure 10C:
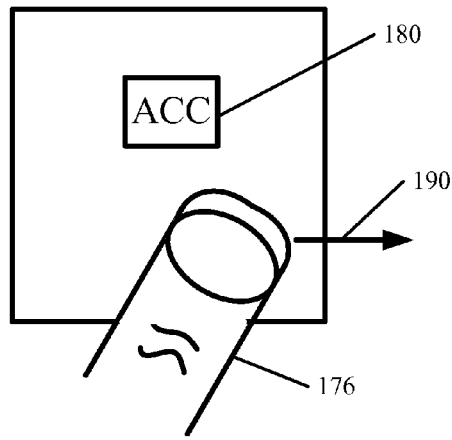

The user input may also indicate the user's desire to change the dynamic display direction. For instance, as shown in FIG. 10B, if the user moves his or her finger 176 in the direction generally indicated by arrow 188, then the direction of the dynamic display (e.g., the scroll) can be moved in that direction as well. Similarly, as shown in FIG. 10C, if the user moves his or her finger 176 in the direction generally indicated by arrow 190, then the scroll direction is changed in that direction so that the beginning of the "account" text is displayed in icon 180. Of course, the same can be done with respect to the zoom features. If the user moves his or her finger in one direction, then this can correspond to a "zoom in" direction. Alternatively, if the user moves his or her finger in a different direction, this can correspond to a "zoom out" direction. Adjusting the dynamic display direction based on the user input is indicated by block 192 in FIG. 9.

The user input can also directly correspond to a position of the text being displayed in the icon, instead of simply changing direction. That is, assume that in FIGS. 10B and 10C, when the user moves his or her finger 176 in a direction indicated by arrow 188, that does not change the direction of the scroll, but changes the absolute position of the text within icon 180. If the user moves finger 176 to the left, then the last several letters in the "account" text will be displayed in a static way until the user does something else. If the user then moves finger 176 to the right (as shown in FIG. 10C) then the first few letters of the "account" text will be displayed in a static way, until the user provides another input. This gives the perception that the user's finger is tethered to text so that the text can be moved through icon box 180 simply by moving finger 176 in either direction. Adjusting the position of the label text being displayed based on the user input is indicated by block 194 in FIG. 9.

Adjusting the icon behavior in other ways, based on the user input, is indicated by block 196 in FIG. 9. FIGS. 11A-12C show a number of alternative embodiments for doing this.

Figure 11A:
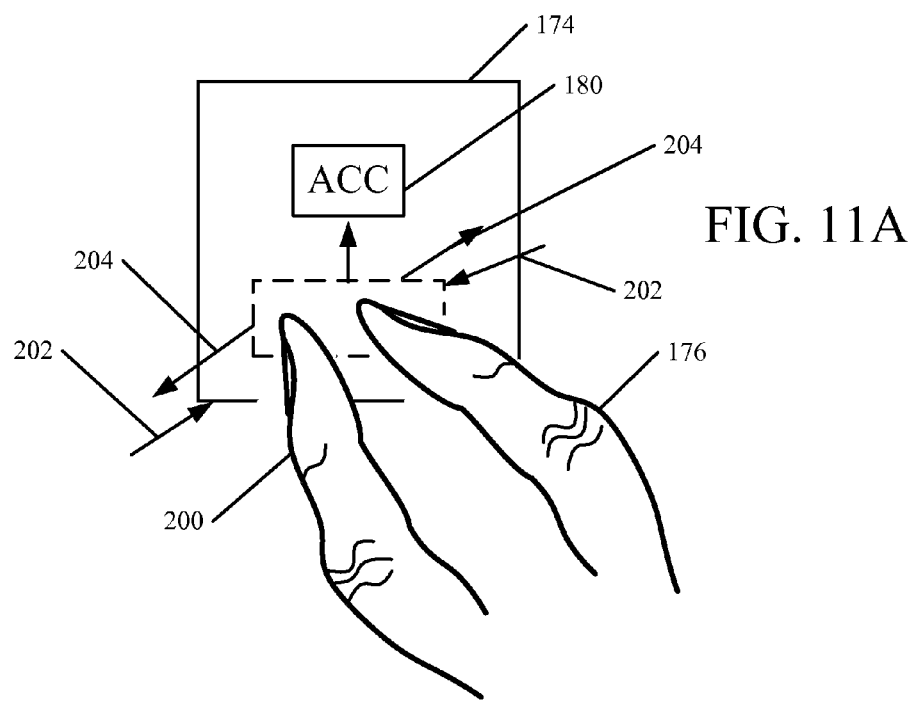
FIGS. 11A and 11B are pictorial illustrations of a user modifying the display.
Figure 11B:
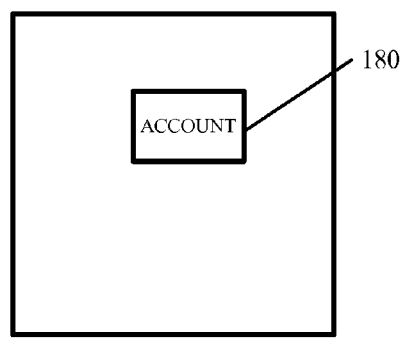

FIGS. 11A and 11B show an embodiment in which the user input is a different kind of touch gesture. In the embodiment shown in FIGS. 11A and 11B, the user places two fingers 176 and 200 (such as the index finger and thumb) on the touch sensitive screen. In that case, system 24 moves the display icon 180 upwardly so that the user's fingers are not blocking the icon. Then, the user can move fingers 176 and 200 in a pinching movement where the fingers are brought closer together as indicated by arrows 202 or the user can move fingers 176 and 200 in a spreading motion where the fingers are moved further apart from one another as indicated by arrows 204. This gesture can be used to control the dynamic display in any of a wide variety of different ways.

For instance, as shown in FIGS. 11A and 11B, the dynamic display is the zoom in and zoom out display discussed above with respect to FIGS. 7 and 8. By exercising the pinching gesture indicated by arrows 202, the user can control system

24 to zoom in on the text in icon 180, in one embodiment. This is shown in FIG. 11A and system 24 has zoomed in on the first several letters of the "account" text label.

Then, by moving the fingers in the opposite direction indicated by arrows 204, the user can control system 24 to zoom out on the text label and display the entire label. This is shown in FIG. 11B where icon 180 now displays the entire text label "account".

Figure 12A:
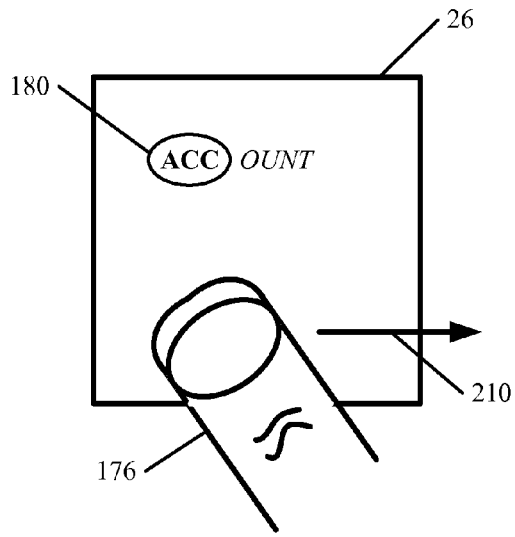
FIGS. 12A-12C are pictorial illustrations of yet another embodiment of the user modifying the display.
Figure 12B:
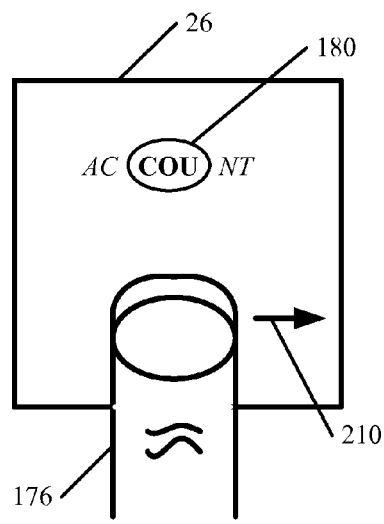

FIGS. 12A and 12B show another alternative embodiment for controlling system 24 to modify the icon behavior. In the embodiment shown in FIGS. 12A and 12B, icon 180 is a movable box. As the user moves finger 176 in either direction, the entire icon 180 moves and displays different texts. This gives the impression that the text of the label is already written on the display screen of display device 26, but it is only revealed when icon 180 travels over it. This can be analogized to icon 180 being the beam of a flashlight. When the beam hits the letters in the text label, those letters become visible. Otherwise, they are not visible.

Figure 12C:
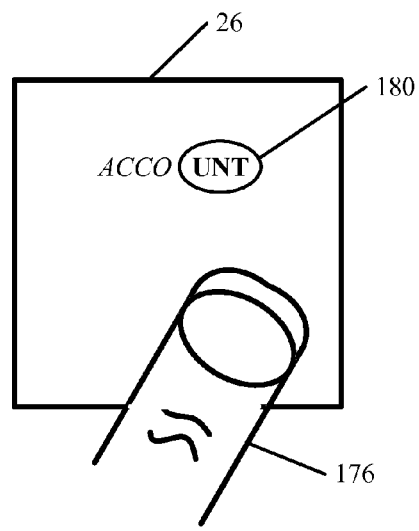

Thus, as indicated in FIG. 12A, icon 180 shows the first three letters of the "account" text label. When the user moves finger 176 in the direction generally indicated by arrow 210, the position of the icon 180 changes on screen 26 in the corresponding direction. This is indicated by FIG. 12B. It can be seen that the position of icon 180 on screen 26 has shifted and the corresponding text being displayed within icon 180 has also changed to the central three letters of the "account" text label. As the user continues to move finger 176 in the direction indicated by arrow 210, the position of icon 180 continues to shift in that direction as well, and the text revealed in icon 180 shifts to the end of the text label "account" to eventually reveal only the last three letters. This is shown in FIG. 12C. As the user moves his or her finger back and forth in either direction, the "flashlight beam" of icon 180 moves in that direction and reveals different, corresponding parts of the text label.

In another embodiment, particular dynamic display patterns for a given entity record 40 can vary based on the type of entity record or based on any other portion or attributes of metadata. For instance, some entity records may better be scrolled while others are better displayed using zoom functionality. Similarly, the background color or the color of the text may be changed based on the type of entity record or based on any other item of metadata. Therefore, when system 24 is generating the icons to dynamically display the text label, the colors of the words and backgrounds or any other typographical elements can be changed based on the metadata and the entity record, or in other ways, as well.

Figure 13:
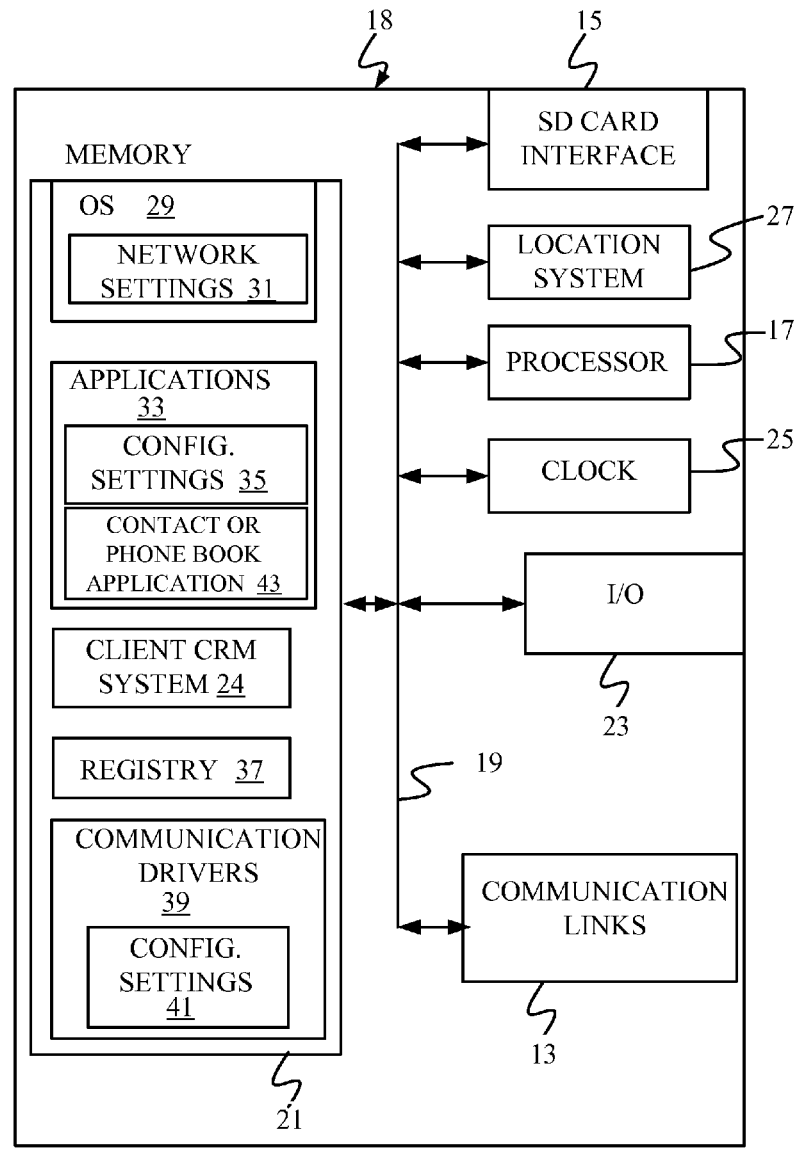
FIGS. 13-15 show a plurality of different embodiments of mobile devices that can be used in the system of FIG. 1.
Figure 14:
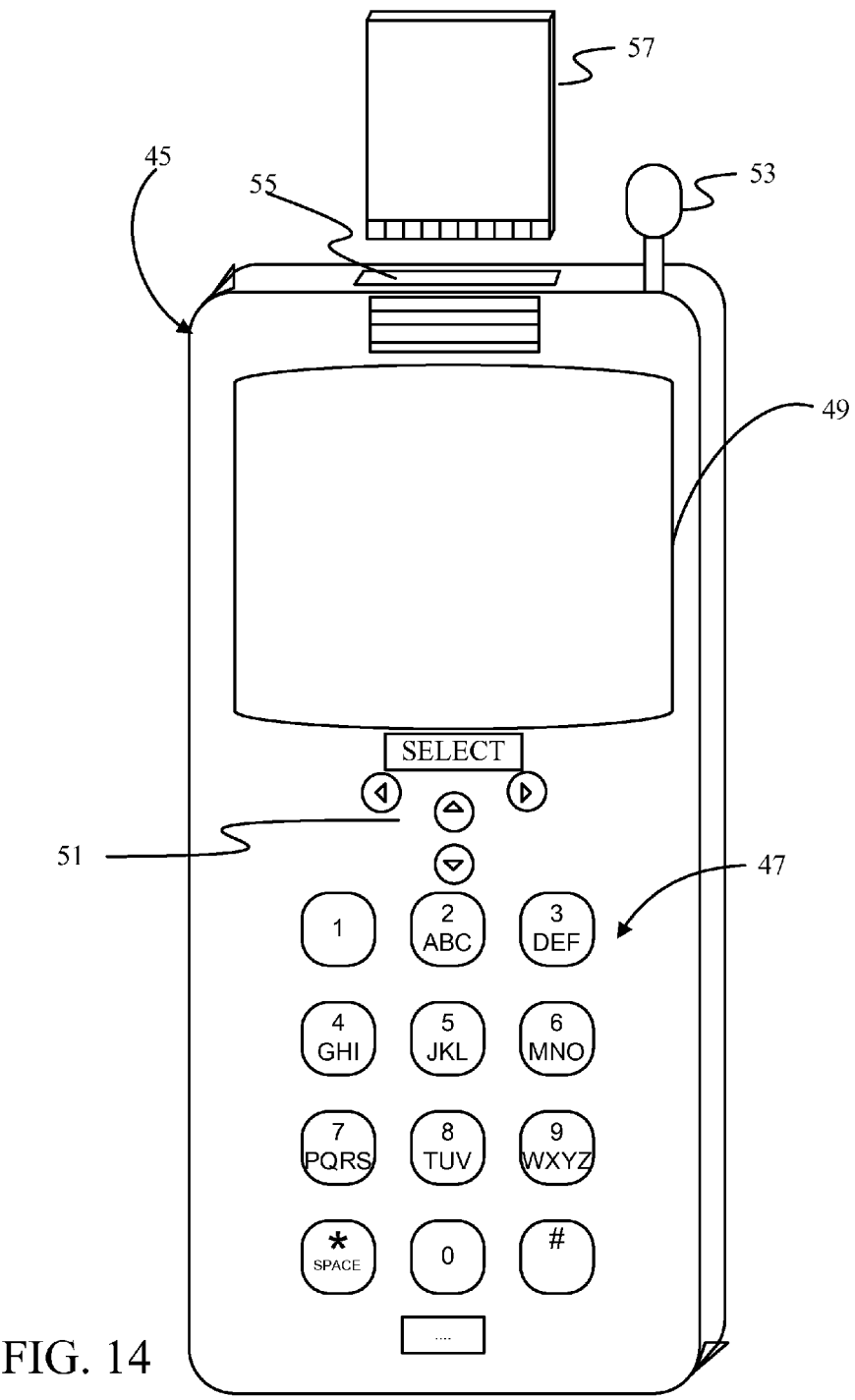
Figure 15:
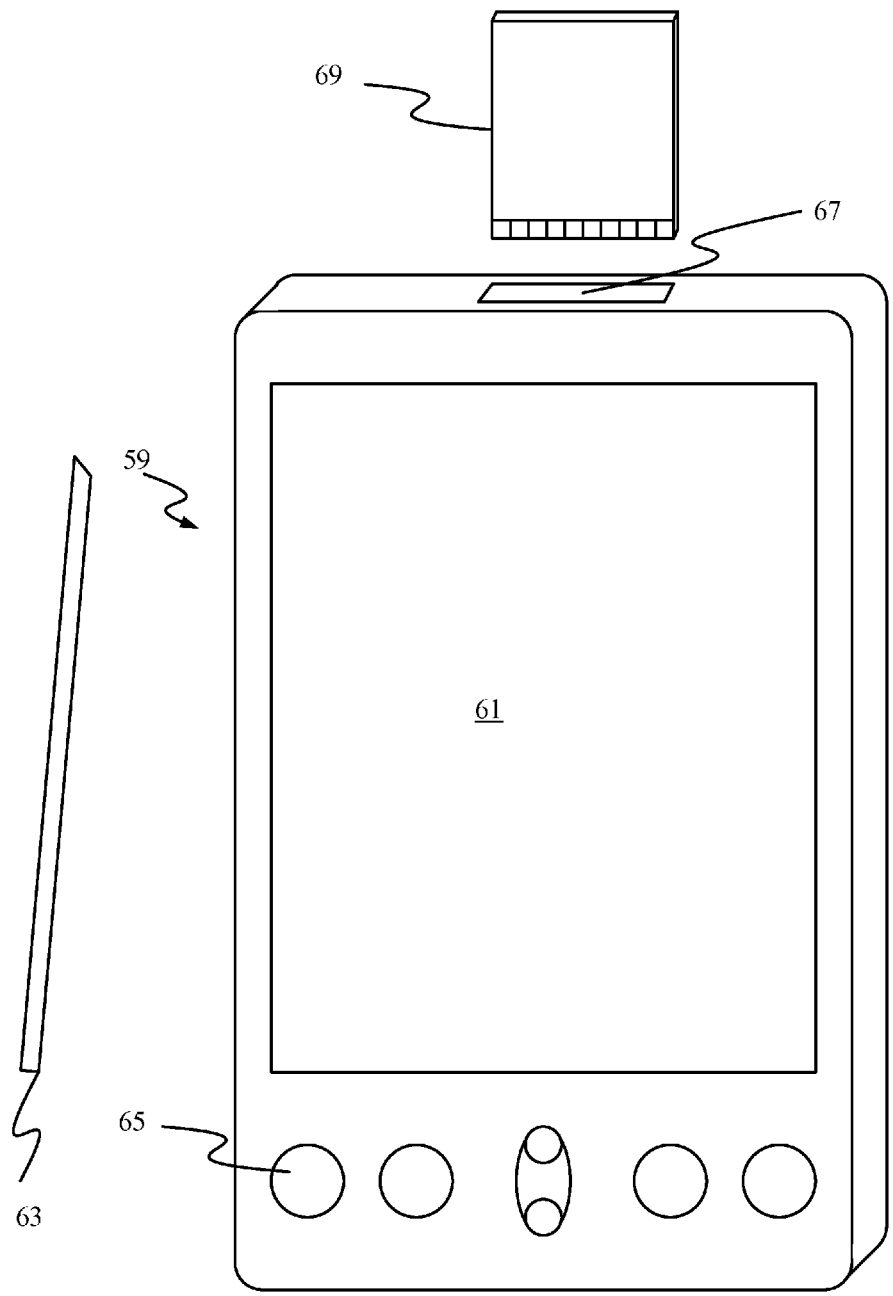

FIGS. 13-15 show a number of different embodiments for client device 18. While these embodiments will be described in FIGS. 13-15, it should be noted that these are not exclusive, but are provided as illustrative and exemplary descriptions of embodiments of client device 18.

It will also be noted that as shown in FIG. 1, client CRM system 24 can reside elsewhere, other than on client device 18. While the embodiment of FIG. 1 shows that client CRM system 24 resides on client device 18, it could be embodied elsewhere as well, such as in a cloud computing environment. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Business software (such as some components of CRM system 10) as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the functions described herein can be provided from a service provider at a remote location using a cloud computing architecture. Alternatively, they can be provided from a conventional server, or they can be installed on client device 18 directly.

In any case, FIG. 13 is a simplified block diagram of one illustrative embodiment of a handheld or mobile computing device that can be used as client device 18, in which the present system can be deployed. FIGS. 14 and 15 are examples of handheld or mobile devices.

FIG. 13 provides a general block diagram of the components of a client device 18 that runs client CRM system 24 or that interacts with system 10, or both. In the device 18, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), 1xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 24) are received on a removable Secure Digital (SD) card that is connected to a SD card interface 15. SD card interface 15 and communication links 13 communicate with a processor 17 along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 18 can include input components such as buttons, touch sensors, touch screens, proximity sensors, microphones, tilt sensors, and gravity switches and output components such as display device 26, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 18. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, registry 37, communication drivers 39, and communication configuration settings 41. Memory 21 can include all types of tangible volatile and non-volatile computer-readable memory devices. Memory 21 stores computer readable instructions that, when executed by processor 17, cause the processor to perform computer-implemented steps or functions according to the instructions. Client CRM system 24, for example, can reside in memory 21. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 18 or applications that are installed during use. In one embodiment, applications 33 include contact or phonebook application 43 and client CRM system 24, although these can be part of operating system 29, or hosted external to device 18, as well.

FIGS. 14 and 15 provide examples of devices 18 that can be used, although others can be used as well. In FIG. 14, a smart phone or mobile phone 45 is provided as the device 18. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1×rtt, and Short Message Service (SMS) signals. In some embodiments, phone 45 also includes a Secure Digital (SD) card slot 55 that accepts a SD card 57.

The mobile device of FIG. 15 is a personal digital assistant (PDA) 59 or a multimedia player or a slate or tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 18 are possible. Examples include tablet or slate computing devices, music or video players, and other handheld computing devices.

Figure 16:
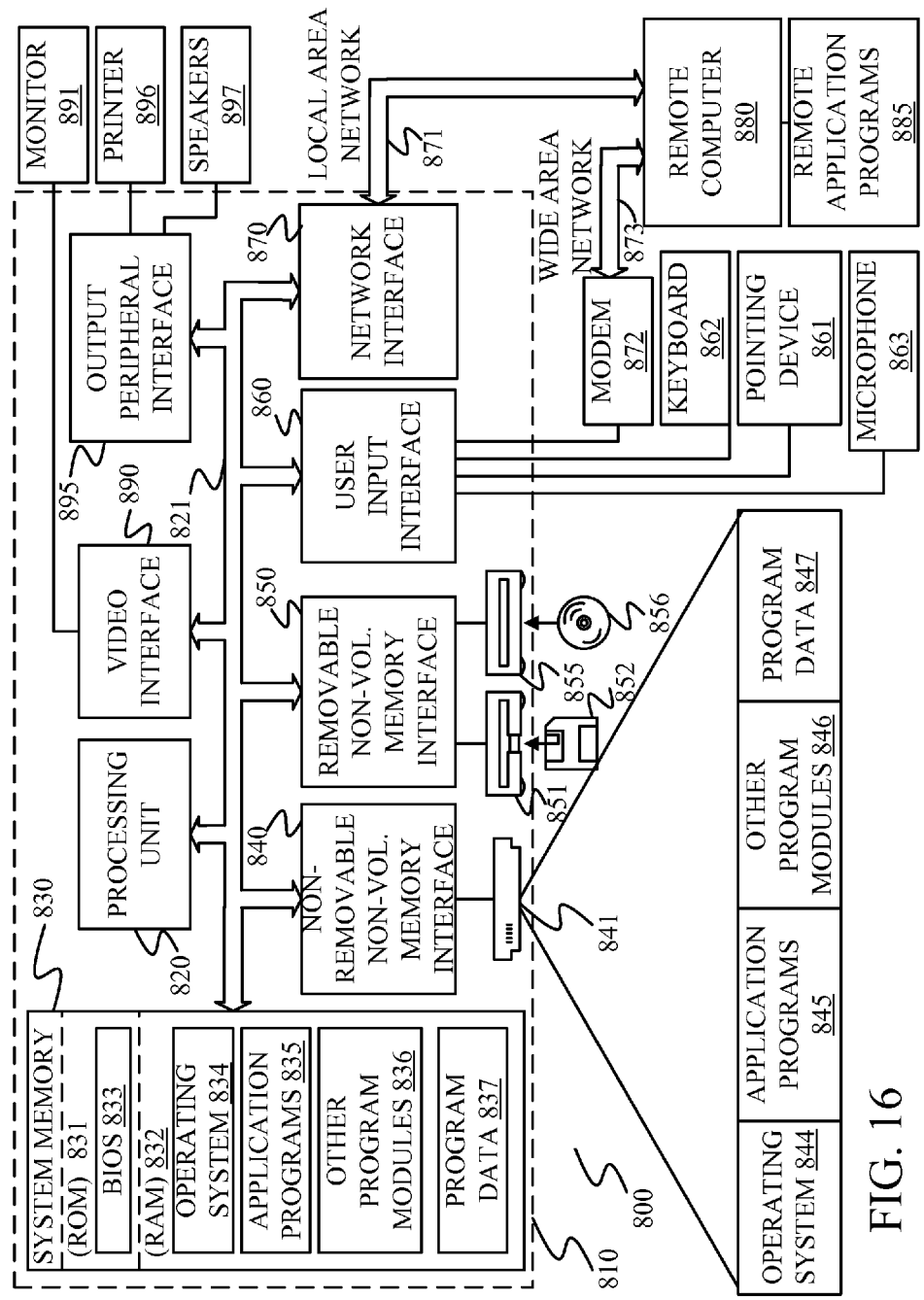
FIG. 16 shows one illustrative computing environment that can be used in the system of FIG. 1.

FIG. 16 is one embodiment of a computing environment in which CRM system 10 (for example) can be deployed. With reference to FIG. 16, an exemplary system for implementing some embodiments includes a general-purpose computing device in the form of a computer 810. Components of computer 810 may include, but are not limited to, a processing unit 820, a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 16.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during startup, is typically stored in ROM 831. RAM 832 typically contains data and/or program modules that are immediately accessible to and/or presently being operated on by processing unit 820. By way of example, and not limitation, FIG. 16 illustrates operating system 834, application programs 835, other program modules 836, and program data 837.

The computer 810 may also include other removable/non-removable volatile/nonvolatile computer storage media. By way of example only, FIG. 16 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 16, provide storage of computer readable instructions, data structures, program modules and other data for the computer 810. In FIG. 16, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies. They can also include search components 802 and 804.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 16 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 16 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of displaying information on a mobile device that has a processor, comprising:
   receiving, at the processor, an indication to display an icon representing an entity, the entity having a label;
   displaying, with the processor on a display screen of the mobile device, a display portion of the icon with a size that precludes display of an entirety of the label, in a first size, at one time; and
   dynamically displaying, with the processor, substantially the entirety of the label in the display portion of the icon.

2. The computer-implemented method of claim 1 wherein dynamically displaying comprises:
   scrolling the label for the entity through the display portion of the icon.

3. The computer-implemented method of claim 2 wherein the label comprises text and wherein scrolling comprises:
   scrolling the text in the label for the entity through the display portion of the icon beginning with a last character in the text in the label and progressing toward a first character in the text in the label.

4. The computer-implemented method of claim 2 wherein scrolling comprises:
   scrolling the label for the entity through the display portion of the icon in a first direction; and
   after scrolling in the first direction, scrolling the label for the entity through the display portion of the icon in a second direction, opposite the first direction.

5. The computer-implemented method of claim 4 wherein scrolling the label in the first direction comprises scrolling the label in a left-to-right direction across the display portion of the icon.

6. The computer-implemented method of claim 4 wherein scrolling the label in the first direction comprises scrolling the label in a top-to-bottom direction across the display portion of the icon.

7. The computer-implemented method of claim 4 wherein scrolling the label in the first direction comprises scrolling the label in a diagonal direction across the display portion of the icon.

8. The computer-implemented method of claim 1 wherein dynamically displaying comprises:
   displaying, within the display portion of the icon, a first portion of the label in a second size, smaller than the first size; and
   displaying a second portion of the label in the display portion of the icon in the first size.

9. The computer-implemented method of claim 8 wherein dynamically displaying further comprises:
   displaying a plurality of different portions of the label, each at a different size between the first and second sizes to visually zoom in on the second portion of the label that is displayed at the first size.

10. The computer-implemented method of claim 9 wherein dynamically displaying further comprises:
    after visually zooming in, displaying the label to visually zoom out to display the first portion of the label.

11. The computer-implemented method of claim 1 and further comprising:
    receiving a user input through a graphical user interface; and
    changing the dynamic displaying of the label based on the user input received.

12. The computer-implemented method of claim 11 wherein the display screen comprises a touch sensitive display screen and wherein receiving a user input comprises:

receiving a touch gesture on the touch sensitive display screen.

13. The computer-implemented method of claim 1 wherein the entity comprises a business related entity in a business application that is customizable by a user of the business application to create a label for the business entity, and further comprising:

prior to receiving the indication to display the icon, receiving from a user of the business application, a customization input that comprises a textual input of the text for the textual label of the business related entity, and wherein dynamically displaying comprises dynamically displaying the text input by the user as the customization input.

14. A mobile device, comprising:

a display screen;

a business related application system that displays an icon on the display screen by dynamically displaying a first portion of a label for the icon, created by a user of a business related application in the system, on a display field of the icon that is too small to display the first portion of the label for the icon at a first size, wherein the system displays at least a portion of the label for the icon on the display field at the first size and dynamically displays the first portion of the label according to a display pattern that exhibits a display behavior comprising either scrolling behavior or zooming behavior; and a processor that comprises a functional component of the mobile device and is activated by the system to facilitate dynamically displaying.

15. The mobile device of claim 14 wherein the system displays a graphical user input on the display screen that receives user inputs and wherein the system changes the display behavior of the display pattern based on the user inputs.

16. The mobile device of claim 15 wherein the system dynamically displays the entirety of the label according to a scrolling pattern that exhibits scrolling behavior.

17. The mobile device of claim 15 wherein the label comprises text that is written in a language that is read in a first direction and wherein the scrolling pattern scrolls the text in a second direction, opposite the first direction.

18. The mobile device of claim 15 wherein the system dynamically displays an entirety of the label according to a zoom pattern that exhibits zooming behavior.

19. The mobile device of claim 14 wherein the display screen comprises a touch sensitive screen that receives user touch inputs and wherein the system changes the display behavior of the display pattern based on the touch inputs.

20. A hardware computer storage medium storing computer readable instructions which, when executed by a computer, cause the computer to perform steps, comprising:

running a business related application;

receiving, from the business related application, an instruction to display a typographic icon representing an entity of the business related application, the entity having a textual label comprising text;

displaying, on a display screen of a mobile device, a display portion of the typographic icon with a size that precludes display of an entirety of the text in the textual label, in a first font size, at one time; and dynamically displaying the entirety of the text in the textual label in the display portion of the icon.

* * * * *